(12) United States Patent
Hanes et al.

(10) Patent No.: US 10,993,057 B2
(45) Date of Patent: Apr. 27, 2021

(54) ELECTRONIC DEVICE MICROPHONE LISTENING MODES

(71) Applicant: HEWLETT-PACKARD DEVELOPMENT COMPANY, L.P., Houston, TX (US)

(72) Inventors: David H. Hanes, Fort Collins, CO (US); Jon R. Dory, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/095,693

(22) PCT Filed: Apr. 21, 2016

(86) PCT No.: PCT/US2016/028655
§ 371 (c)(1),
(2) Date: Oct. 22, 2018

(87) PCT Pub. No.: WO2017/184149
PCT Pub. Date: Oct. 26, 2017

(65) Prior Publication Data
US 2019/0132694 A1 May 2, 2019

(51) Int. Cl.
*H04R 29/00* (2006.01)
*H04R 1/08* (2006.01)
(Continued)

(52) U.S. Cl.
CPC .......... *H04R 29/004* (2013.01); *G06F 3/167* (2013.01); *H04R 1/083* (2013.01); *H04R 1/342* (2013.01);
(Continued)

(58) Field of Classification Search
CPC ...... H04R 29/004; H04R 1/083; H04R 1/342; H04R 1/406; H04R 3/00; H04R 3/005;
(Continued)

(56) References Cited

U.S. PATENT DOCUMENTS

| | | | | |
|---|---|---|---|---|
| 5,561,737 A | * | 10/1996 | Bowen | H04M 3/56 704/275 |
| 7,472,058 B2 | * | 12/2008 | Tseng | G06F 3/16 348/729 |

(Continued)

FOREIGN PATENT DOCUMENTS

| | | |
|---|---|---|
| CN | 1288223 | 3/2001 |
| CN | 1813284 | 8/2006 |

(Continued)

OTHER PUBLICATIONS

Aarts, M., et al., "Two Sensor Array Beamforming Algorithm for Android Smartphones", Delft University of Technology, Jul. 4, 2012, 45 pages.

(Continued)

*Primary Examiner* — Xu Mei
(74) *Attorney, Agent, or Firm* — Michael A. Dryja (57) ABSTRACT

A wide range, non-focused listening mode of a microphone of an electronic device can be set to be selectively less than a maximal range around the device. The microphone can be operated in the wide range, non-focused listening mode to detect a spoken trigger phrase. The microphone can then be operated in a narrow range, focused listening mode directed towards a location from which the spoken trigger phrase was detected in the wide range, non-focused listening mode.

11 Claims, 8 Drawing Sheets

(51) Int. Cl.
*H04R 1/34* (2006.01)
*H04R 3/00* (2006.01)
*H04R 1/40* (2006.01)
*G06F 3/16* (2006.01)
*G10L 21/0216* (2013.01)
*G10L 15/08* (2006.01)

(52) U.S. Cl.
CPC ............... *H04R 1/406* (2013.01); *H04R 3/00* (2013.01); *H04R 3/005* (2013.01); *G10L 2015/088* (2013.01); *G10L 2021/02166* (2013.01); *H04R 2430/20* (2013.01)

(58) Field of Classification Search
CPC ..... H04R 2430/20; G06F 3/167; G10L 25/78; G10L 25/87; G10L 2021/02166
USPC .................. 381/110, 58, 91, 92, 122
See application file for complete search history.

(56) References Cited

U.S. PATENT DOCUMENTS

| | | | |
|---|---|---|---|
| 9,113,240 B2 | 8/2015 | Ramakrisfinan et al. | |
| 9,549,717 B2* | 1/2017 | Contolini | A61B 17/00 |
| 10,306,361 B2* | 5/2019 | Morton | H04R 3/005 |
| 2004/0022392 A1 | 2/2004 | Griesinger | |
| 2009/0018828 A1 | 1/2009 | Nakadai et al. | |
| 2009/0204410 A1 | 8/2009 | Mozer et al. | |
| 2013/0190041 A1 | 7/2013 | Andrews et al. | |
| 2014/0222436 A1 | 8/2014 | Binder et al. | |
| 2016/0012827 A1 | 1/2016 | Alves et al. | |
| 2016/0173978 A1* | 6/2016 | Li | G10L 21/02 381/92 |
| 2019/0130911 A1* | 5/2019 | Hanes | G06F 3/167 |

FOREIGN PATENT DOCUMENTS

| | | |
|---|---|---|
| CN | 101132839 | 2/2008 |
| CN | 102498709 | 6/2012 |
| CN | 103403798 | 11/2013 |
| CN | 103888861 | 6/2014 |
| WO | WO-2014159581 | 10/2014 |

OTHER PUBLICATIONS

Seltzer, M.L., "Microphone Array Processing for Robust Speech Recognition", Carnegie Mellon University, Jul. 2003, 163 pages.

* cited by examiner

ELECTRONIC DEVICE MICROPHONE LISTENING MODES

BACKGROUND

Voice recognition has become sufficiently advanced that it is becoming a popular way by which users interact with electronic devices, instead of interacting with them via text entry. For example, many smartphones and other mobile computing devices can be configured to be in an "always listening" mode. A user might be able to ask, "what's the weather going to be like tomorrow," without having to type in this question, and receive a verbal response in return from the device. As another example, more recently, electronic devices have become available that are intended to remain stationary within users' homes. A user can thus in the comfort of his or her own home ask similar questions, as well as add items to a shopping list that may be retrievable from the user's smartphone, for instance, when the user is later at a store.

DETAILED DESCRIPTION

As noted in the background section, voice recognition has become a popular manner by which users engage in conversations with their electronic devices to receive desired information. Such technology permits electronic devices to be more conveniently and safely used. For example, a user can request information in this way while driving without having to take his or her eyes off the road. A user can request information in this manner while walking around his or her house without having to pull out a smartphone, open a tablet computing device, or access a laptop or desktop computer.

However, eliciting information from electronic devices verbally is often not as reliable as entering a request for the information directly on the device in a textual manner. A user may be located in a noisy environment, making it difficult for the electronic device to discern the user's voice clearly. As another example, the electronic device may be placed against a wall or in a corner, resulting in the device picking up echoes of the user's voice that then have to be cancelled correctly for the verbal request to be properly understood.

Disclosed herein are techniques that alleviate these issues when verbally requesting information from an electronic device. In one example technique, a microphone of such a device is operable in two modes: a wide range, non-focused listening mode, and a narrow range, focused listening mode. The device operates in the former mode to listen for a spoken trigger phrase, such as "hey device." Once the device detects the trigger phrase, the electronic device then operates in the latter mode, directing its microphone towards the location from which the spoken trigger phrase was detected.

In another example technique, the wide range, non-focused listening mode can be set to selectively ignore certain locations from its maximal range, which may be 360 degrees around the device. For example, a fish tank may have a noisy bubbler, resulting in undue background noise. Specifying the wide range listening mode to ignore sound from the direction of the tank results in less background noise being picked up by the microphone.

As another example, a television when being watched can inadvertently result in the electronic device detecting the trigger phrase when the same or similar phrase is output by the TV. Specifying the wide range, non-focused listening mode to ignore sound from the direction of the television decreases the likelihood that this will occur. As a third example, the electronic device may be placed along a wall or in a corner, resulting in the device's microphone detecting echoes off the walls that have to be correctly cancelled for optimal speech recognition. Specifying the wide range listening mode to ignore sound from the direction of such walls means that optimal speech recognition is more likely to occur.

Figure 1:
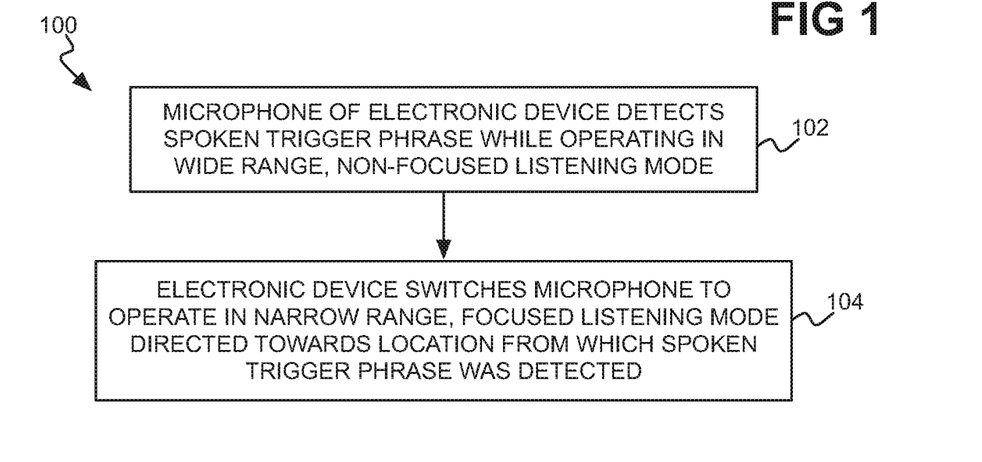
FIG. 1 is a flowchart of an example method for operating a microphone of an electronic device in different listening modes.

FIG. 1 shows an example method 100 for operating a microphone of an electronic device in various listening modes. The method 100 can be performed by the electronic device. For example, the method 100 may be implemented as computer-executable code stored on a non-transitory computer-readable data storage medium and executable by the electronic device.

The microphone of the electronic device, while operating in a wide range, non-focused listening mode, detects a spoken trigger phrase (102). The microphone may continuously operate in this listening mode while the electronic device is on and operational, for instance, until it hears the trigger phrase being spoken. The wide range, non-focused listening mode can be the maximal range around the electronic device from which the microphone can detect sound. For example, this range may be 360 degrees around the electronic device. This listening mode can be a non-focused listening mode in that the microphone does not direct its focus to any particular portion within its overall listening range, but rather is non-focused and can listen over the entire defined wide range.

The trigger phrase is pre-specified, and a user may be able to select the trigger phrase. The trigger phrase can include one or a number of words in succession. The purpose of the trigger phrase can be so that the electronic device is able to discern that detected speech is intended for the device. For example, if two people are in the same room and one person asks the other, "what's the weather supposed to be like tomorrow," the electronic device should not audibly respond with tomorrow's weather forecast because the communication was not directed to the device. By comparison, if the trigger phrase is "hey device," and a person says out loud, "hey device, what's the weather supposed to be like tomorrow," the electronic device will determine that the person wants the device to provide tomorrow's weather forecast, because the question was preceded by the trigger phrase.

In response to the microphone detecting the spoken trigger phrase while operating in the wide range, non-focused listening mode, the electronic device switches the microphone to operate in a narrow range, focused listening mode, directed towards the location from which the spoken trigger phrase was detected (104). Operating in the narrow range, focused listening mode causes the microphone to detect sound just from the direction from which the spoken trigger phrase was heard. The narrow range, focused listening mode differs from the wide range, non-focused listening. The former mode has a narrower range; for example, rather than listening 360 degrees around the electronic device as in the latter mode, in the narrow range, focused listening the microphone may listen over a much smaller angle, such as 15-30 degrees. The narrow range, focused listening mode can be a focused listening mode because the microphone focuses on a particular area to optimally hear just the person who uttered the spoken trigger phrase.

Figure 2:
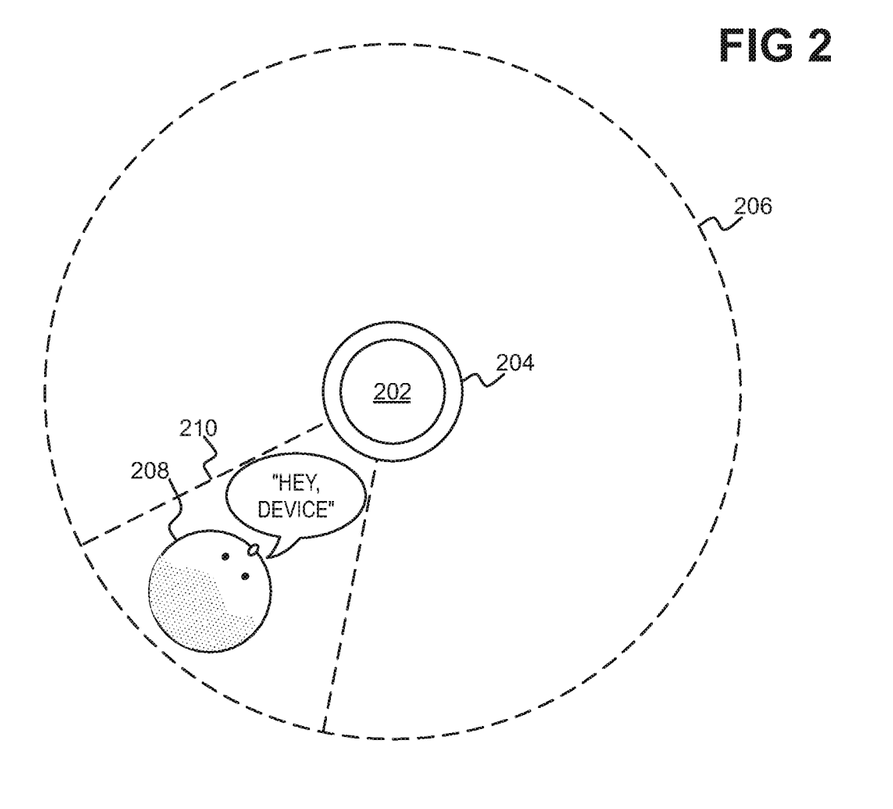
FIG. 2 is a diagram of example illustrative performance of the method of FIG. 1.

FIG. 2 shows example illustrative performance of the method 100. An electronic device 202 has a microphone 204 disposed around the perimeter of the device 202. As such, in the wide range, non-focused listening mode, the microphone 204 may be able to listen in a 360-degree circular range 206 around the electronic device 202. While the microphone 204 is in this listening mode, a user 208 speaks the trigger phrase, such as "hey device," which the microphone 204 detects.

In response to the microphone 204 detecting the spoken trigger phrase, the electronic device causes the microphone 204 to operate in the narrow range, focused listening mode, directed towards the location from which the trigger phrase was detected. Thus, in the example of FIG. 2, in the narrow range, focused listening mode, the microphone 204 subsequently listens to a smaller, angular range 210 as compared to the full 360-degree circular range 206. The microphone 204 thus is likely to be able to more clearly hear (i.e., detect) subsequent utterances from the user 208, because the microphone 204 is no longer detecting sound from other portions within the 360-degree circular range 206.

Figure 3:
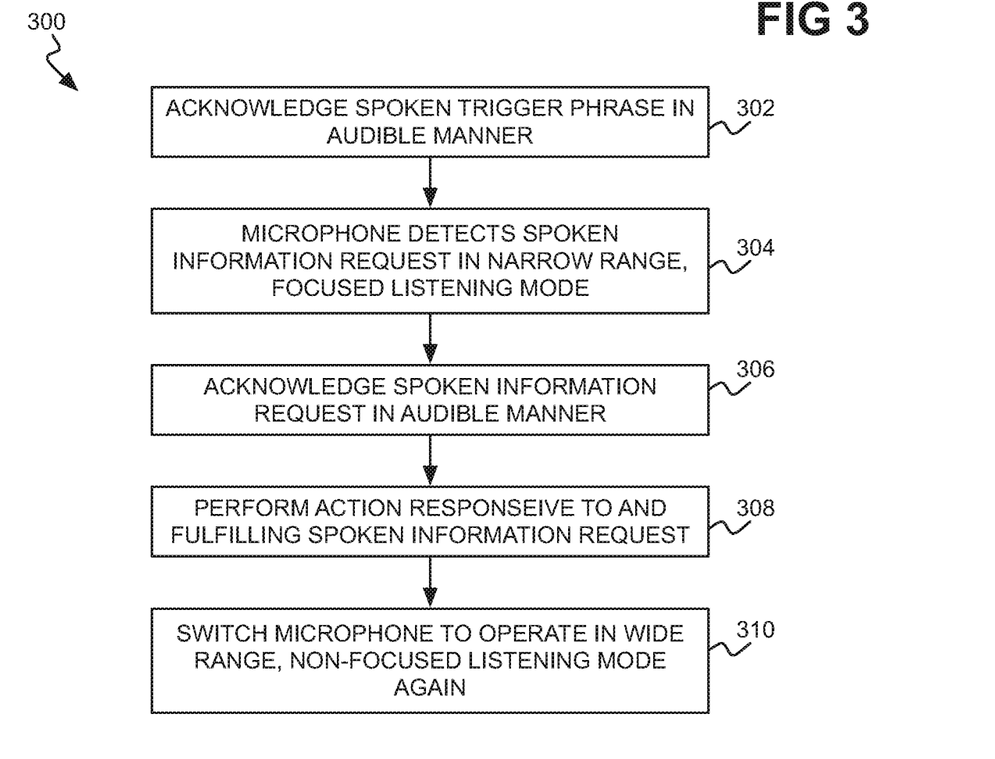
FIG. 3 is a flowchart of an example method for operating a microphone of an electronic device in a narrow range, focused listening mode.

FIG. 3 shows an example method 300 for operating a microphone of an electronic device in a narrow range, focused listening mode. For instance, the method 300 may be performed after the method 100, once the microphone has detected the spoken trigger phrase while operating in the wide range, non-focused listening mode, and the electronic device has switched the microphone to operate in the narrow range, focused listening mode. The method 300 can be implemented in the same manner as the method 100 can be, as described above.

The electronic device may audibly acknowledge that its microphone has detected the spoken trigger phrase, by using a speaker of the device (302). In another implementation, the acknowledgment can be visual, such as via a light-emitting diode (LED). For example, if a user utters the trigger phrase and then pauses before saying anything further, the user may be waiting for the device to confirm that its microphone has detected the spoken trigger phrase. Therefore, the electronic device may, via its speaker, speak an acknowledgment such as, "what would you like for me to do," or even "what's up."

The microphone of the electronic device detects a spoken information request in the narrow range, focused listening mode, from the direction and within the location in which the microphone initially detected the trigger phrase in the wide range, non-focused listening mode (304). A user may make a spoken information request that the user believes the electronic device can fulfill. The spoken information request may be in the form of a question, such as "what is weather going to be like this weekend." The request may be in the form of a command, such as "add eggs and milk to my shopping list," or "change the radio station to classic pop hits."

The electronic device may audibly acknowledge that its microphone has detected the spoken information request, by using the device's speaker (306). In another implementation, the acknowledgment can be visual, such as via an LED. Such audible or visual acknowledgement can be made if fulfilling the request is taking more time than the user might expect. For example, if a number of seconds have passed after the user has asked for tomorrow's weather forecast, the electronic device may announce, "I'm looking up your weather now, give me a second." As another example, if the spoken information request is a command and not a question, the acknowledgment may indicate whether the command was successfully fulfilled or not. For example, if the user has told the device to place eggs and milk on his or her shopping list, the electronic device may announce, "Done—I've added eggs and milk to your shopping list."

The electronic device performs an action responsive to and that fulfills the spoken information request (308). This action can include a spoken answer if the information request was a question. For example, if the user asked for Thursday's weather, the electronic device may say via the device's speaker, "it's looking really nice for Thursday—a high in the mid-70s with sunny skies," after retrieving the weather forecast from an online source. The electronic device thus can communicate with computing devices over networks, such as the Internet as well as local networks, in order to fulfill the request by performing an appropriate action.

Once the electronic device has completed the action, it may continue to operate in the narrow range, focused listening mode in case the user who had initially uttered the trigger phrase has other information requests for the device to fulfill. The electronic device may even, after having fulfilled a request, ask the user "anything else," for instance. If the user says something to the effect of a negative answer, or even if the electronic device does not ask the user if he or she has any additional information requests and if no further utterance is detected, after a predetermined length of time the device may switch the microphone to operate in the wide range, non-focused listening mode again (310). As such, the method 100 may again be performed.

Figure 4:
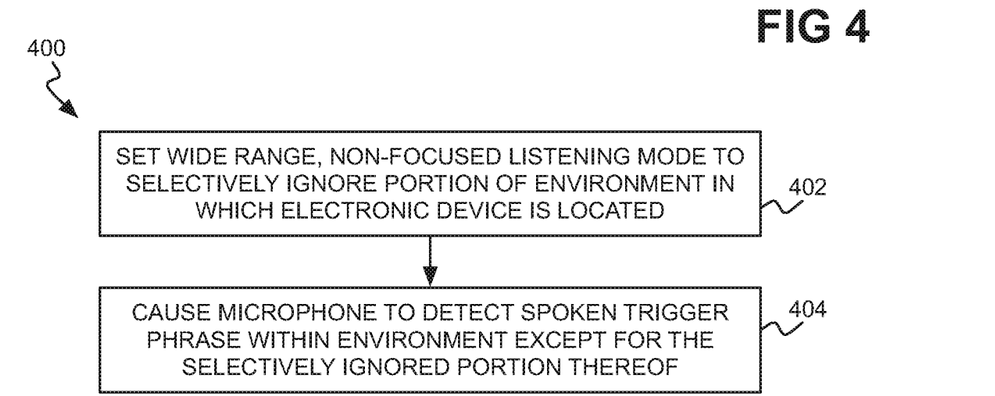
FIG. 4 is a flowchart of an example method for customizing a wide range, non-focused listening mode in which a microphone of an electronic device is operable.

FIG. 4 shows an example method 400 for customizing a wide range, non-focused listening mode of a microphone of an electronic device. The method 400 may be performed before the method 100, for instance, to configure the electronic device for optimal operational in its microphone's ability to detect the utterance of the trigger phrase by a user. The method 400 can be implemented in the same manner as the method 100 can be, as described above.

The wide range, non-focused listening mode of the electronic device's microphone is set to selectively ignore a portion of the environment in which the device is located (402). More than one portion can be selectively ignored. Each portion can be defined as an angular partial circle of the maximal range of the microphone around the electronic device. For example, if the maximal range of the microphone in the wide range, non-focused listening mode is 360 degrees around the electronic device, a portion can be defined as a specified number of degrees, such as between 15-45, for instance, starting at a particular angular location within the maximal circular range. As such, the wide range, non-focused listening mode is set to be selectively less than the maximal range around the electronic device, taking into account the environment in which the device is located so that the microphone does not listen for and ignores the spoken trigger phrase within a portion of the environment.

Once the wide range, non-focused listening mode of the microphone of the electronic device has been set to selectively ignore at least one portion of the environment in which the device is located, the device causes the microphone to detect the spoken trigger phrase within the environment, except for the selectively ignored portion of the environment (404). Stated another way, the electronic device causes the microphone to enter the wide range, non-focused listening mode and continuously listen for the spoken trigger phrase. Therefore, the method 100 can be performed after part 404 of the method 400, so that when the spoken trigger phrase is detected, the electronic device causes the microphone to operate in the narrow range, focused listening mode.

Figure 5:
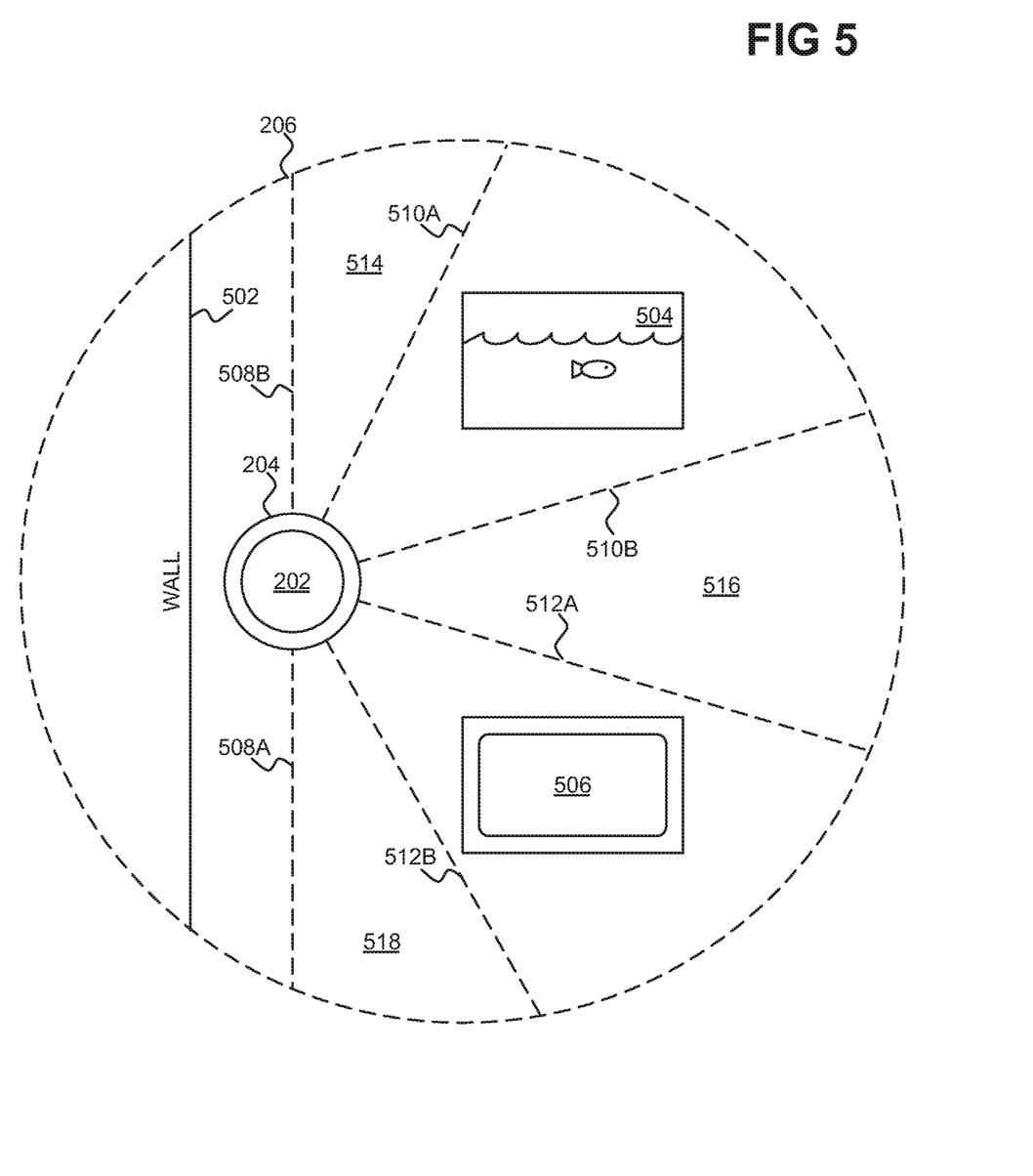
FIG. 5 is a diagram of example illustrative performance of the method of FIG. 4.

FIG. 5 shows example illustrative performance of the method 400. The electronic device 202 has the microphone 204 disposed around the perimeter of the device 202. In the wide range, non-focused listening mode, the microphone 204 may be able to maximally listen in the 360-degree circular range 206 around the electronic device 202. The electronic device 202 is located against a wall 502, and a fish tank 504 and a television 506 are also located in the room in question.

The wide range, non-focused listening mode is set to selectively ignore three portions of the environment of FIG. 5. The first portion is defined as a 180-degree semi-circular arc from the dotted line 508A clockwise to the dotted line 508B to encompass the wall 502. Therefore, echoes of sound reflecting off the wall 502 are less likely to be heard (i.e., detected) by the microphone 204. The second portion is defined as a partially circular arc from the dotted line 510A clockwise to the dotted line 510B to encompass the fish tank 504. Therefore, sound emanating from the fish tank 504 is less likely to be detected by the microphone 204. The third portion is defined as a partially circular arc from the dotted line 512A clockwise to the dotted line 512B to encompass the television 506. Therefore, sound emanating from the television 506 is less likely to be detected by the microphone 204.

Once the wide range, non-focused listening mode has been set to selectively ignore these three portions of the environment of FIG. 5, the microphone 204 of the electronic device 202 in this listening mode will listen for the spoken trigger phrase just within portions 514, 516, and 518 of the maximal 360-degree circular range 206 around the device 202. Detection of the spoken trigger phrase is likely to improve, because background noise from the fish tank 504 and the television 506 is minimized and sound reflections off the wall 502 are likewise minimized. Furthermore, false positives of the spoken trigger phrase by the user, such as from a television program being displayed on the television 506 with corresponding sound emanating from the speakers of the television 506, are less likely to be detected.

The portion, or portions, of the environment in which the electronic device is located that are selectively ignored can be defined directly or indirectly. In the following description, various examples are presented in which these portions are defined directly, via defining and/or specifying the portions that are to be selectively ignored in the wide range, non-focused listening mode. However, the portions can also be defined indirectly. For instance, the portions that are not to be selectively ignored in the wide range, non-focused listening mode may be defined and/or specified directly, which thus indirectly defines the portions that are to be ignored as the environment in which the electronic device is located excluding the defined areas that are not to be ignored. Specifying the portions of the environment to be ignored thus encompasses both such direct and indirection specification and/or definition.

Figure 6:
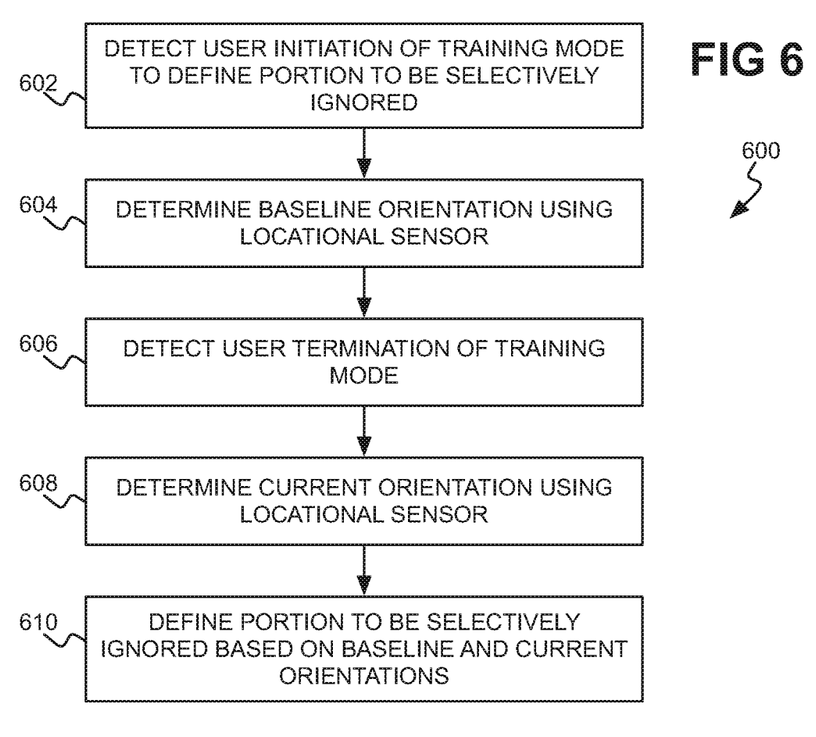
FIG. 6 is a flowchart of an example method for defining a portion of the environment in which an electronic device is to be selectively ignored by a microphone of the device in a wide range, non-focused listening mode.

FIG. 6 shows an example method 600 for setting the wide range, non-focused listening mode of a microphone of an electronic device to selectively ignore a portion of the environment in which the device is located. The method 600 can be performed as an example technique to implement part 402 of the method 400. The method 600 can be implemented in the same manner as the method 100, as described above.

A user interface of the electronic device detects user initiation of a training mode to define the portion to be selectively ignored when the microphone of the device is operated in the wide range, non-focused listening mode (602). As one example, the user interface may be a physical button that the user can actuate. The user interface may be a touchscreen interface, or even the microphone itself, insofar as the user may verbally interact with the device to initiate the training mode. The user interface may also be a mobile computing device of the user, such as a smartphone, with which the user is able to communicate and control the electronic device.

In response to detecting user initiation of the training mode, a locational sensor of the electronic device determines a baseline orientation of the device (604). The locational sensor is able to determine the relative or absolute location or orientation of the electronic device. The locational sensor may be an accelerometer, a gyroscope, a digital compass, a global positioning system (GPS) sensor, or another type of locational sensor. The baseline orientation of the electronic device is the device's orientation upon the user initiating the training mode. Subsequent to the locational sensor determining the device's baseline orientation, the user then moves the electronic device, which can include rotating the device while it remains in the same absolute location.

The user interface of the electronic device then detects user termination of the training mode (606). For example, the same physical button used to initiate the training mode can also be used to terminate the training mode. In response to detecting user termination of the training mode, the locational sensor of the electronic device determines the current location of the device (608). The current location of the electronic device is the device's orientation upon the user terminating the training mode.

The electronic device defines the portion to be selectively ignored by the microphone of the device in the wide range, non-focused listening mode based on the baseline and current orientations of the device that have been determined by the device's locational sensor (610). For example, the portion can be defined as a partially circular angular arc between the baseline orientation and the current orientation. If the user rotated the electronic device clockwise between initiating the training mode and terminating the training mode, this arc likewise is defined clockwise from the baseline orientation to the current orientation. If the user rotated the electronic device counter-clockwise between initiating and terminating the training mode, this arc is likewise defined counter-clockwise from the baseline orientation to the current orientation.

Figure 7A:
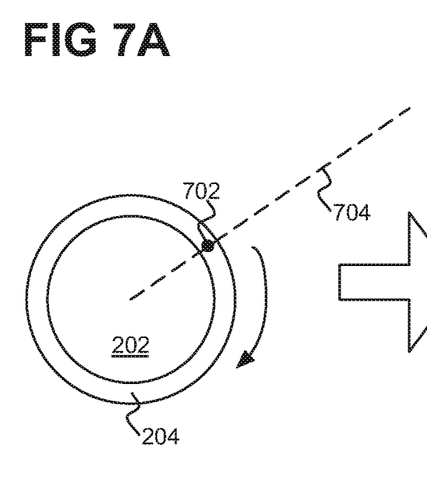
FIG. 7 is a diagram of example illustrative performance of the method of FIG. 6.
Figure 7B:
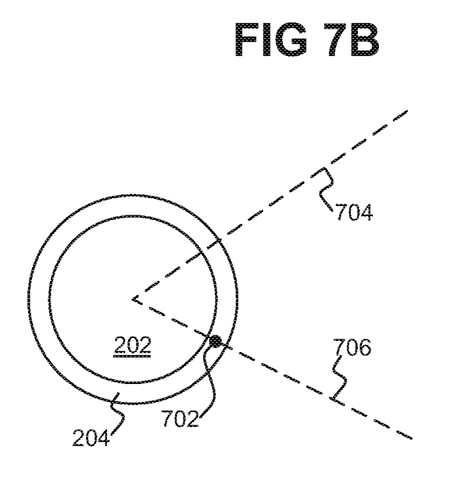

FIGS. 7A and 7B show example illustrative performance of the method 600. The electronic device 202 has the microphone 204 disposed around its perimeter. The electronic device 202 also has a physical button 702. In FIG. 7A, the user rotates the electronic device 202 so that an imaginary line 704 extending from the center of the device 202 through the physical button 702 demarcates the beginning of the portion to be selectively ignored by the microphone 204 in the wide range, non-focused listening mode. The user then actuates the button 702 to initiate the training mode, and a locational sensor of the electronic device 202 responsively detects the baseline orientation.

After initiating the training mode, the user rotates the electronic device 202 clockwise so that, in FIG. 7B, an imaginary line 706 extending from the center of the device 202 through the physical button 702 demarcates the end of the portion to be selectively ignored by the microphone in the wide range, non-focused listening mode. The user again presses the button 702, which terminates the training mode. The locational sensor of the electronic device 202 responsively detects the current orientation, and the device 202 defines the portion to be selectively ignored between the imaginary line 704 clockwise to the imaginary line 706.

Figure 8:
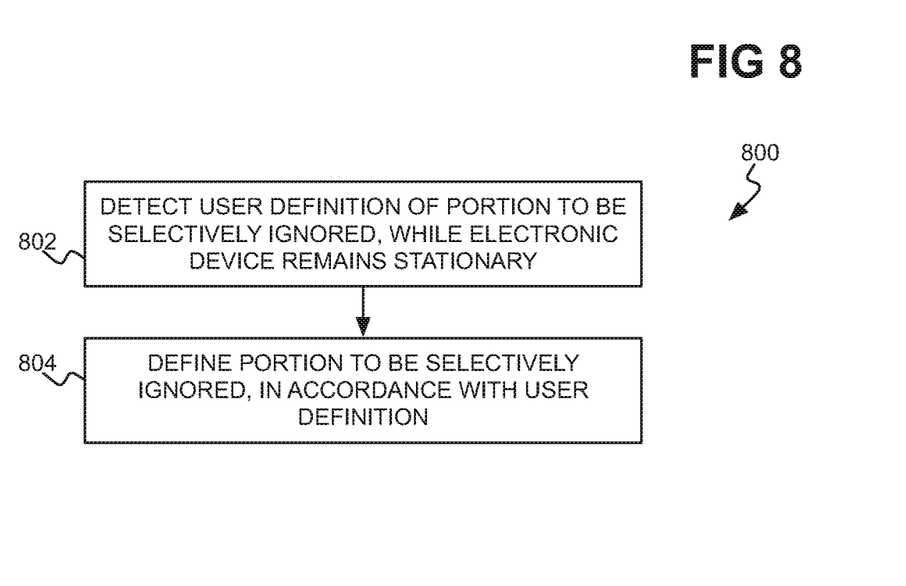
FIG. 8 is a flowchart of another example method for defining a portion of the environment in which an electronic device is to be selectively ignored by a microphone of the device in a wide range, non-focused listening mode.

FIG. 8 shows another example method 800 for setting the wide range, non-focused listening mode of a microphone of an electronic device to selectively ignore a portion of the environment in which the device is located. The method 800 can be performed as an example technique to implement part 402 of the method 400. The method 800 can be implemented in the same manner as the method 100, as described above.

A user interface, such as a touch-sensitive surface, of the electronic device detects user definition of the portion to be selectively ignored when the microphone of the device is operated in the wide range, non-focused listening mode (802). As one example, at least a circular range on the top surface of the electronic device may be touch sensitive. To define the portion to be selectively ignored, the user may tap and hold a finger on a location of the touch-sensitive surface corresponding to the desired start of the portion to be selectively ignored, then move the finger clockwise or counter-clockwise along the surface, and finally release the finger at the location corresponding to the desired end of the portion.

As another example, the user may tap and release a location of the touch-sensitive surface corresponding to the desired beginning of the portion to be selectively ignored, and then tap and release another location of the surface corresponding to the desired end of the portion. In this latter example, the portion may be defined from the first tapped and last tapped locations either clockwise or counter-clockwise, as pre-specified by the user for instance. In another implementation, the portion may be defined from the first tapped and last tapped locations over the smaller number of angular degrees between these two locations. For example, if there are 45 degrees between the locations in a clockwise direction from the first tapped location to the last tapped location, and thus 360−45=315 degrees in a counter-clockwise direction, the portion is defined as the 45 degrees between the locations in the clockwise direction as the smaller number of angular degrees.

The electronic device then defines the portion of the environment to be selectively ignored in the wide range, non-focused listening mode of the device's microphone in accordance with the user definition (804). Multiple portions to be selectively ignored may be defined in succession by repeatingly performing the method 800. The user may be prompted with spoken feedback from a speaker of the electronic device to assist him or her in defining the portion to be selectively ignored.

Figure 9:
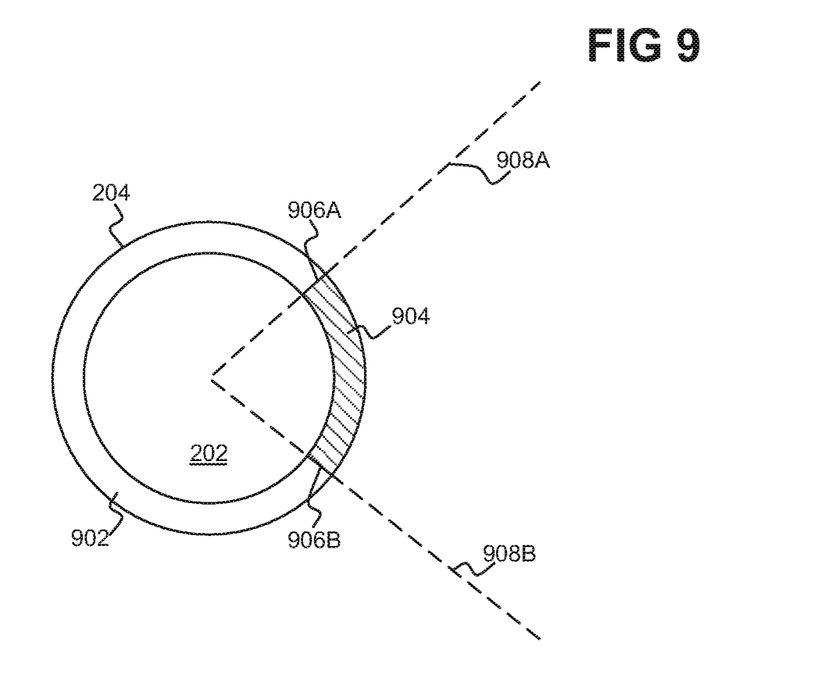
FIG. 9 is a diagram of example illustrative performance of the method of FIG. 8.

FIG. 9 shows example illustrative performance of the method 800. The electronic device 202 has the microphone 204 disposed around its perimeter. The electronic device 202 remains stationary while the portion to be selectively ignored in the wide range, non-focused listening mode is defined by the user. The electronic device includes a touch sensitive surface 902 on its top surface, in a 360-degree ring or band on the outer portion of the top surface.

In the example of FIG. 9, a user taps and holds a finger at a location 906A of the touch-sensitive surface 902. The user moves this finger clockwise along the shaded portion 904 of the touch-sensitive surface 902, and finally releases it at a location 906B. Therefore, the electronic device 202 defines the portion to be selectively ignored by the microphone 204 from the dotted lined 908A, corresponding to the location 906A at which the user tapped, and held his or her finger on the touch-sensitive surface 902, clockwise to the dotted line 908B, corresponding to the location 906B at which the user released the finger from the surface 902.

Figure 10:
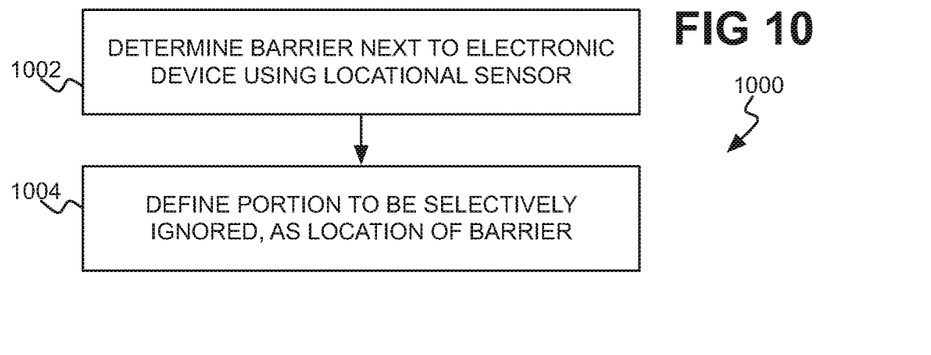
FIG. 10 is a flowchart of a third example method for defining a portion of the environment in which an electronic device is to be selectively ignored by a microphone of the device in a wide range, non-focused listening mode.

FIG. 10 shows a third example method 1000 for setting the wide range, non-focused listening mode of a microphone of an electronic device to selectively ignore a portion of the environment in which the device is located. The method 1000 can be performed as an example technique to implement part 402 of the method 400. The method 1000 can be implemented in the same manner as the method 100, as described above.

A locational sensor of the electronic device determines a barrier next to the electronic device within the environment (1002). For instance, the locational sensor may be one or more optical or other type of wave-emitting and detecting sensors. There may be one sensor that is able to emit and then detect directed waves around the electronic device. Such a sensor may be movable or a multi-directional sensor. There may be more than one such sensor disposed in an array around the perimeter of the electronic device, particularly if each sensor is not multi-directional. Each sensor emits a wave, such as an optical wave, and detects whether the wave has been reflected by a barrier.

As such, the location of the barrier can be determined based on those waves that were reflected and detected and those waves that were not reflected and not detected. For instance, if an array of locational sensors is disposed around the perimeter of the electronic device, the location of the barrier may extend clockwise starting at the first sensor that detected a reflected wave that was emitted, through zero or more other sensors that each detected a reflected wave that was emitted, and ending at the last sensor that detected a reflected wave that was emitted. The electronic device defines the portion of the environment to be selectively ignored in the wide range, non-focused listening mode of the device's microphone as the barrier's location (1004). If multiple contiguous groups of locational sensors detected reflected waves, then multiple barrier locations can be defined as corresponding multiple portions to be selectively ignored.

Figure 11:
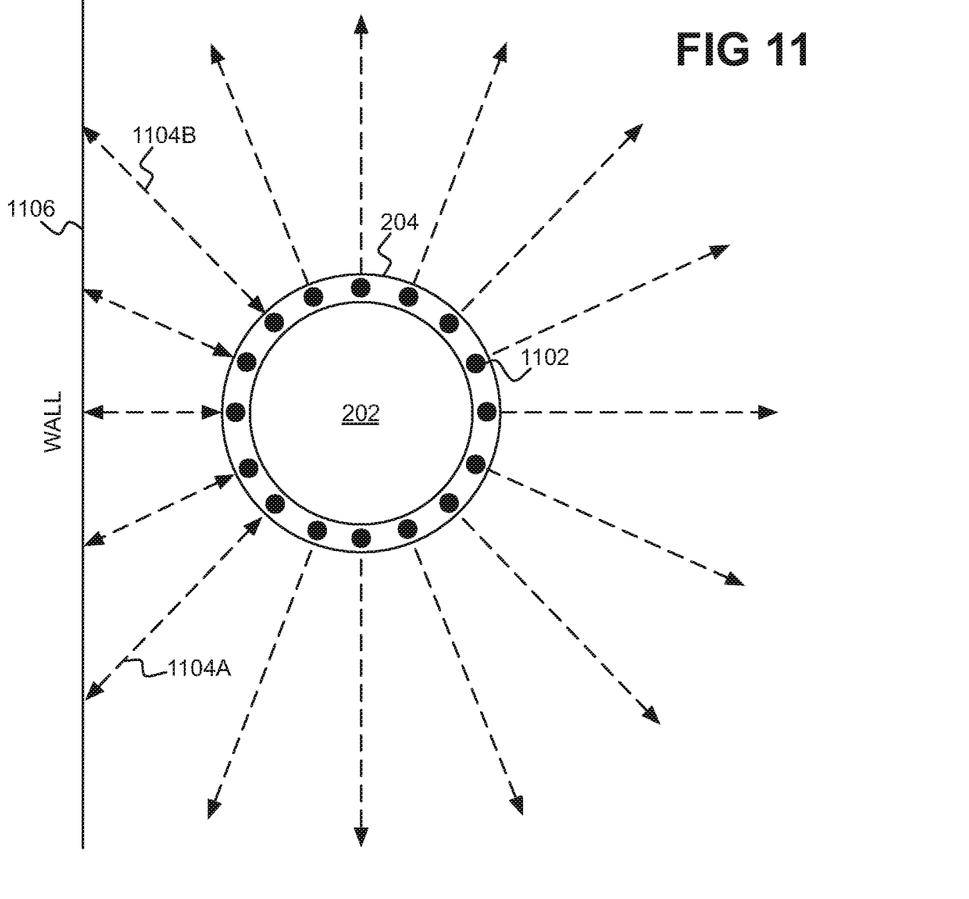
FIG. 11 is a diagram of example illustrative performance of the method of FIG. 10.

FIG. 11 shows example illustrative performance of the method 1000. The electronic device 202 is positioned next to a wall 1106, which is an example of a barrier. The electronic device 202 has the microphone 204 disposed around its perimeter. The electronic device 202 includes an array of locational sensors 1102 disposed around its perimeter as well. Each sensor 1102 emits a corresponding wave, and then attempts to detect the wave as reflected by a barrier such as the wall 1106.

In the example of FIG. 11, the sensor 1102 emitting the wave 1104A is the first sensor in a clockwise direction that detected a wave reflected off the wall 1106, within a contiguous group of sensors 1102 that each detected a wave reflected off the wall 1106. This group ends at the sensor 1102 emitting the wave 1104B, which is the last sensor in a clockwise direction that detected a wave reflected off the wall 1106. Therefore, the electronic device defines the portion to be selectively ignored within the environment as the location of the wall 1106 as determined by the locational sensors 1102. Specifically, the location of the wall 1106 is determined as the partial circular region defined from an imaginary line corresponding to the wave 1104A clockwise to an imaginary line corresponding to the wave 1104B. In another implementation, the location may be determined as the partial circular region defined starting at an imaginary line corresponding to the wave that the reflection of which was not detected and that is immediately prior to the wave 1104A in a clockwise direction, and ending at an imaginary line corresponding to the wave that the reflection of which was not detected and that is immediately subsequent to the wave 1104B in the clockwise direction.

Figure 12:
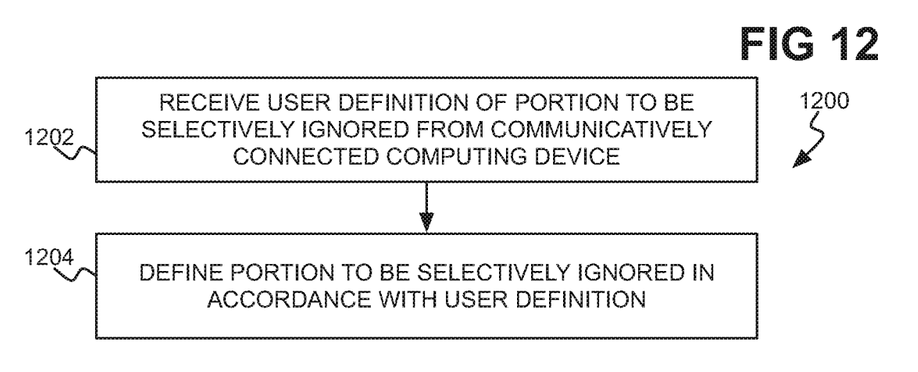
FIG. 12 is a flowchart of a fourth example method for defining a portion of the environment in which an electronic device is to be selectively ignored by a microphone of the device in a wide range, non-focused listening mode.

FIG. 12 shows a fourth example method 1200 for setting the wide range, non-focused listening mode of a microphone of an electronic device to selectively ignore a portion of the environment in which the device is located. The method 1200 can be performed as an example technique to implement part 402 of the method 400. The method 1200 can be implemented in the same manner as the method 100, as described above.

The electronic device receives user definition of the portion to be selectively ignored when the microphone of the device is operated in the wide range, non-focused listening mode, from a computing device to which the electronic device is communicatively connected (1202). For instance, a user may use a smartphone, another type of mobile computing device, a tablet computing device, a laptop or desktop computer, or another type of computing device altogether. The computing device may be running an application program or app that displays a graphical representation of the electronic device, and permits the user to select a partial circular angular region or arc around the device as the portion to be selectively ignored. One or more such portions may be defined in this manner.

The electronic device receives this user definition of the portion to be selectively ignored from the computing device in a wired and/or wireless manner. The electronic device and/or the computing device may be connected to a network, such as a local-area network (LAN), a wide-area network (WAN), the Internet, and so on, in a wired or wireless manner in this respect. The electronic device and the computing device may be connected more directly to one another, such as over a peer-to-peer Bluetooth wireless connection, or via a cable such as a universal serial bus (USB) cable connecting the two devices. Once the electronic device has received the user definition of the portion to be selectively ignored, the electronic device defines the portion to be selectively ignored by its microphone in the wide range, non-focused listening mode in accordance with this user definition (1204).

Figure 13:
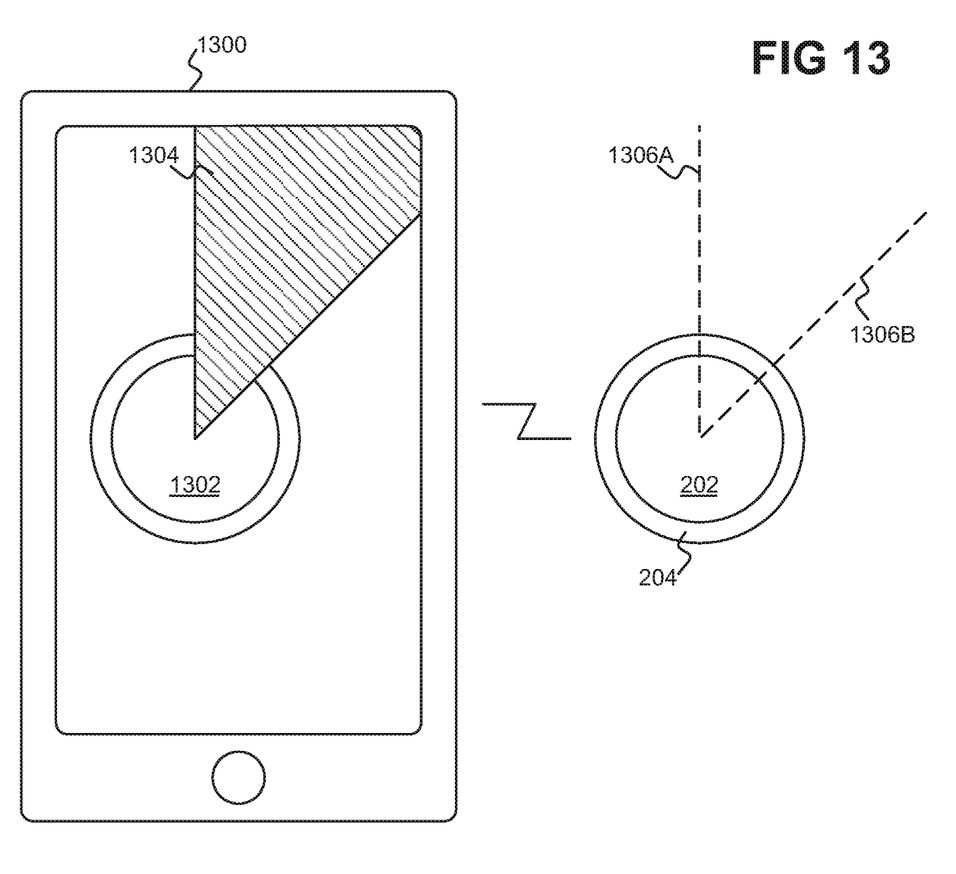
FIG. 13 is a diagram of example illustrative performance of the method of FIG. 12.

FIG. 13 shows example illustrative performance of the method 1200. The electronic device 202 has the microphone 204 disposed around its perimeter. A computing device 1300, such as a smartphone in the example of FIG. 13, has displayed on its touch-sensitive display a graphical representation 1302 of the electronic device 202. The user is permitted to select or draw the region around the graphical representation 1302. In the example of FIG. 13, the user has selected or drawn a partial circular angular region 1304.

The electronic device 202 receives the user definition of this region 1304 from the computing device 1300, to which the device 202 is communicatively connected. The electronic device 202 defines the portion to be selectively ignored by the microphone 204 in the wide range, non-focused listening mode in accordance with this user definition. As such, the electronic device defines the portion from the dotted line 1306A to the dotted line 1306B, which encompasses an angular region have an angle corresponding to that of the region 1304 selected or drawn by the user on the computing device 1300.

Figure 14:
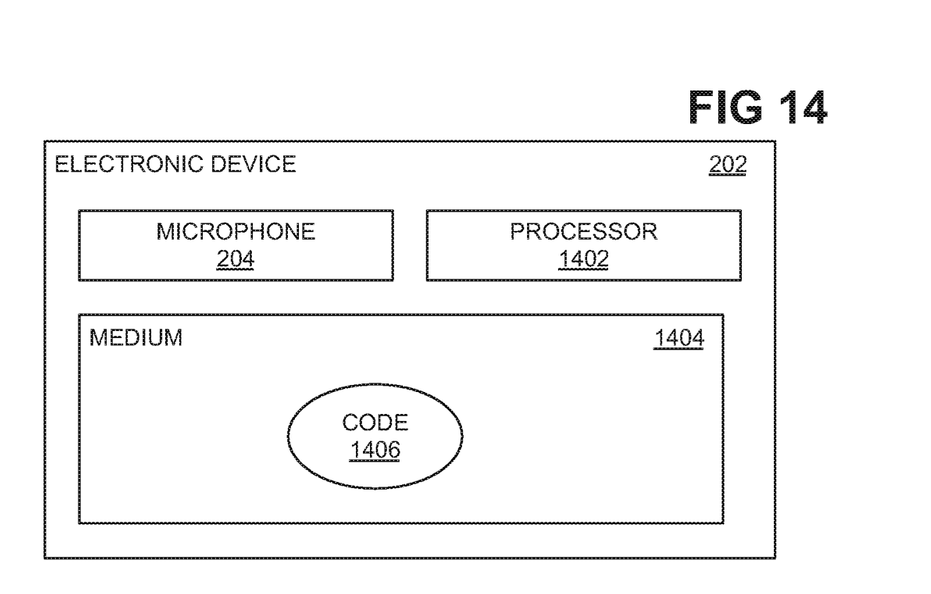
FIG. 14 is a diagram of an example electronic device having a microphone.

FIG. 14 shows the example electronic device 202. The electronic device 202 includes the microphone 204, as has been described. The electronic device 202 further includes a processor 1402 and a non-transitory computer-readable data storage medium 1404. The electronic device 202 can include other components as well, such as a speaker, one or more locational sensors, communication hardware to permit the device 202 to communicate over a network, and so on.

The computer-readable data storage medium 1404 stores computer-executable code 1406 that the processor 1402 executes. The processor 1402 can execute the code 1406 to perform the methods that have been described. For instance, the processor 1402 can execute the code 1406 to specify the wide range, non-focused listening mode of the microphone 204 to be selectively less than the maximal range around the device 202. The processor 1402 can execute the code 1406 to operate the microphone 204 in this listening mode to detect a spoken trigger phrase, and then to operate the microphone 204 in a narrow range, focused listening mode directed towards the location from which the spoken trigger phrase was detected.

Figure 15:
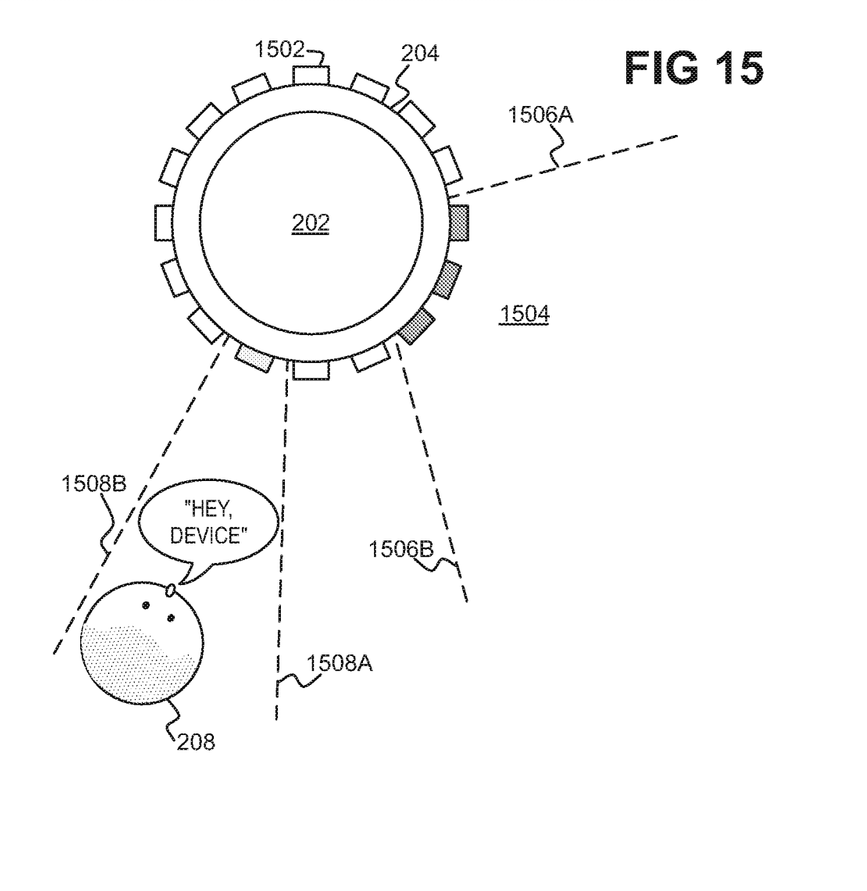
FIG. 15 is a diagram of an example electronic device having a microphone including a number of microphone mechanisms.

FIG. 15 shows the example electronic device 202 with an example specific implementation of the microphone 204. In FIG. 15, the microphone includes a number of discrete microphone units or mechanisms 1502 disposed around the perimeter of the electronic device 202. Each microphone mechanism 1502 can be separately turned on and off, at least operationally. That is, each microphone mechanism 1502 can be either powered on and off completely, or functionally turned on and off. When a microphone mechanism 1502 is functionally off, the mechanism 1502 is still powered on, but the sound it detects is ignored, whereas when a mechanism 1502 is functionally on, the mechanism 1502 is powered on and the sound it detects is not ignored.

Each microphone mechanism 1502 can be directional, in that it primarily detects sound emanating from the direction that the mechanism 1502 faces. Further, the microphone mechanisms 1502 detect sound independently of one another. That is, the ability of one microphone mechanism 1502 to detect sound is not based on the ability of any other mechanism 1502 to detect sound.

In the wide range, non-focused listening, all of the microphone mechanisms 1502 of the microphone 204 may be at least operationally turned on, unless a portion of the environment in which the electronic device 202 is located to be selectively ignored by the microphone 204 has been defined. For example, in FIG. 15, the partial circular region 1504 between the dotted lines 1506A and 1506B may have been defined as a portion to be selectively ignored by the microphone 204. Therefore, in one implementation, the microphone mechanisms 1502 between the dotted lines 1506A and 1506B may be at least operationally turned off when the electronic device 202 operates the microphone 204, at least in the wide range, non-focused listening mode.

When the electronic device 202 switches the microphone 204 so that it instead operates in the narrow range, focused listening mode, the device 202 may perform a beamforming technique in relation to the microphone 204 so that the microphone is directed towards the location from a spoken trigger phrase that was previously detected in the wide range, non-focused listening mode. For example, in FIG. 15, while the microphone 204 is operating in the wide range, non-focused listening mode, it may detect the user 208 uttering the trigger phrase (e.g., "hey device") from a location between the dotted lines 1508A and 1508B. Therefore, the electronic device 202 causes the microphone 204 to operate in the narrow range, focused listening mode directed towards this location.

In one implementation, the electronic device 202 can perform a beamforming technique in relation to the microphone 204 in this example by at least operationally turning off the microphone mechanisms 1502 other than those within the location from which the spoken trigger phrase was detected. As depicted in FIG. 15, in this example just one microphone mechanism 1502, between the dotted lines 1508A and 1508B, may remain operationally on. In another implementation, the electronic device 202 may also keep one or more microphone mechanisms 1502 to either side of location defined between the dotted lines 1508A and 1508B turned on, but weight their input less than the microphone mechanisms 1502 between the dotted lines 1508A and 1508B.

As one example of such an implementation, the microphone mechanisms 1502 outside the area between the dotted lines 1508A and 1508B but immediately adjacent to the dotted lines 1508A and 1508B may have their input weighted 50%, and their neighboring mechanisms 1502 weighted 25%. The other microphone mechanisms 1502 outside the area between the dotted lines 1508A and 1508B may be at least operationally turned off. Other beamforming techniques can also be employed when the microphone mechanism 204 is operating in the narrow range, focused listening mode.

The techniques disclosed herein can thus provide for improved detection by the microphone 204 of the spoken trigger phrase in the wide range, non-focused listening mode, as well as for improved detection by the microphone 204 of subsequent spoken information requests in the narrow range, focused listening. The former can be achieved via defining one or more portions of the environment in which the electronic device 202 is located to be ignored by the microphone 204 in the wide range, non-focused listening mode. The latter can be achieved via operating the microphone 204 in the narrow range, focused listening mode, directed towards the location from which the spoken trigger phrase was detected, after the spoken trigger phrase was detected in the wide range, non-focused listening mode.

We claim:

1. A method comprising:
setting, by an electronic device including a microphone, a spatial region of a wide range, non-focused listening mode in which sound is detected within the spatial region, the spatial region set selectively less than a maximal range around the electronic device to take into account an environment in which the electronic device is located and so that the microphone does not listen for and ignores a spoken trigger phrase within a portion of the environment in the wide range, non-focused listening mode;
switching the microphone, by the electronic device, to operate in the wide range, non-focused listening mode;
in response to the microphone detecting the spoken trigger phrase in the wide range, non-focused listening mode, switching the microphone, by the electronic device, to operate in a narrow range, focused listening mode in which sound is detected only within a region narrower than the spatial region and encompassing a location from which the spoken trigger phrase was detected in the wide range, non-focused listening mode; and
in response to the microphone detecting a spoken information request other than the spoken trigger phrase in the narrow range, focused listening mode, performing, by the electronic device, an action responsive to the spoken information request.

2. The method of claim 1, further comprising, in response to detecting the spoken trigger phrase:
acknowledging, by a speaker of the electronic device, the spoken trigger phrase in one or more of an audible manner and a visual manner.

3. The method of claim 1, further comprising:
acknowledging, by the electronic device, the spoken information request in one or more of an audible manner or a visual manner.

4. An electronic device comprising:
a microphone;
a processor;
a non-transitory computer-readable data storage medium storing computer-executable code that the processor is to execute to:
specify a spatial region of a non-focused listening mode of the microphone to be selectively less than a maximal range around the electronic device;
operate the microphone in the non-focused listening mode in which sound is detected within the spatial region;
in response to the microphone detecting a spoken trigger phrase in the non-focused listening mode, operate the microphone in a focused listening mode in which sound is detected only within a region narrower than the spatial region and encompassing a location from which the spoken trigger phrase was detected in the non-focused listening mode; and
in response to the microphone detecting a spoken information request other than the spoken trigger phrase in the focused listening mode, perform an action responsive to the spoken information request.

5. The electronic device of claim 4, wherein the microphone comprises a array of microphone mechanisms disposed around the electronic device,
and wherein the processor is to specify the non-focused listening mode of the microphone to be selectively less than the maximal range around the electronic device by at least operationally turning off one or more of the microphone mechanisms of the array.

6. The electronic device of claim 4, wherein the processor is to operate the microphone in the focused listening mode by performing a beamforming technique in relation to the microphone.

7. The electronic device of claim 4, further comprising:
a locational sensor,
wherein the processor is to specify the non-focused listening mode of the microphone to be less than the maximal range around the electronic device by using the locational sensor so that the microphone does not listen for and ignores the spoken trigger phrase within a portion of an environment in which the electronic device is located.

8. A non-transitory computer-readable data storage medium storing computer-executable code that an electronic device having a microphone executes to:
specify a spatial region of a wide range listening mode of the microphone to be selectively less than a maximal range around the electronic device;
cause the microphone to operate in the wide range listening mode in which sound is detected within the spatial region;
in response to the microphone detecting a spoken trigger phrase in the wide range listening mode, cause the microphone to operate in a narrow range listening mode in which sound is detected only within a region narrower than the spatial region and encompassing a location from which the spoken trigger phrase was detected in the wide range listening mode; and
in response to the microphone detecting a spoken information request other than the spoken trigger phrase in the narrow range listening mode, perform an action responsive to the spoken information request.

9. The non-transitory computer-readable data storage medium of claim 8, wherein the microphone comprises a array of microphone mechanisms disposed around the electronic device,
and wherein the electronic device is to specify the wide range listening mode of the microphone to be selectively less than the maximal range around the electronic device by at least operationally turning off one or more of the microphone mechanisms of the array.

10. The non-transitory computer-readable data storage medium of claim 8, wherein the electronic device is to cause the microphone to operate in the narrow range listening mode by performing a beamforming technique in relation to the microphone.

11. The non-transitory computer-readable data storage medium of claim 8, wherein the electronic device further has a locational sensor,
and wherein the electronic device is to specify the wide range listening mode of the microphone to be less than the maximal range around the electronic device by using the locational sensor so that the microphone does not listen for and ignores the spoken trigger phrase within a portion of an environment in which the electronic device is located.

\* \* \* \* \*